(12) United States Patent
Morioka et al.

(10) Patent No.: US 8,063,308 B2
(45) Date of Patent: Nov. 22, 2011

(54) HALOGEN FREE ELECTRIC WIRE, WIRE BUNDLE, AND AUTOMOTIVE WIRING HARNESS

(75) Inventors: Tsunenori Morioka, Osaka (JP); Hiroshi Hayami, Osaka (JP); Masayuki Ishikawa, Kanuma (JP); Seie Kobayashi, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 746 days.

(21) Appl. No.: 11/659,816

(22) PCT Filed: Oct. 18, 2005

(86) PCT No.: PCT/JP2005/019068
§ 371 (c)(1),
(2), (4) Date: Feb. 9, 2007

(87) PCT Pub. No.: WO2006/057120
PCT Pub. Date: Jun. 1, 2006

(65) Prior Publication Data
US 2007/0246243 A1    Oct. 25, 2007

(30) Foreign Application Priority Data

Nov. 26, 2004  (JP) ................. 2004-341762
Jul. 14, 2005  (JP) ................. 2005-205219

(51) Int. Cl.
*H01B 3/46* (2006.01)

(52) U.S. Cl. ........... 174/110 SR; 174/113 R; 174/121 A
(58) Field of Classification Search ............ 174/110 SR, 174/110 R, 110 PM, 113 R, 121 A
See application file for complete search history.

(56) References Cited

U.S. PATENT DOCUMENTS

| | | | | |
|---|---|---|---|---|
| 3,886,056 | A  * | 5/1975 | Kitamaru et al. | 522/161 |
| 4,131,636 | A  * | 12/1978 | Matsumoto et al. | 524/93 |
| 4,434,251 | A  * | 2/1984 | Sasajima et al. | 521/50.5 |
| 4,737,526 | A  * | 4/1988 | Mukaiyama et al. | 521/145 |
| 6,068,935 | A  * | 5/2000 | Hayami et al. | 428/482 |
| 6,319,961 | B1 * | 11/2001 | Takahashi | 521/143 |
| 2003/0217864 | A1* | 11/2003 | Ishikawa et al. | 174/135 |

FOREIGN PATENT DOCUMENTS

| | | |
|---|---|---|
| JP | 1-243309 | 9/1989 |
| JP | 3-247639 | * 11/1991 |
| JP | 8-36916 | 2/1996 |
| JP | 11-116741 | 4/1999 |
| JP | 2002-78168 | 3/2002 |

(Continued)

*Primary Examiner* — Chau Nguyen
(74) *Attorney, Agent, or Firm* — McDermott Will & Emery LLP

(57) ABSTRACT

Provided are a halogen-free electric wire including an insulation coating the life of which is less reduced in the case of the insulating coating being in contact with a PVC-resin-containing member; a wire bundle including the halogen-free electric wire and a PVC-resin-containing member, wherein a reduction in the life of a covering material of the halogen-free electric wire is lessened; and an automotive wiring harness comprising the wire bundle. The halogen-free electric wire includes a conductor and a covering material that covers the outer surface of the conductor, wherein the covering material includes a polyolefin resin and a flame retardant, and the flame retardant contains aluminum hydroxide as a main component, in particular, at a ratio of 80 weight percent or more. The wire bundle includes the halogen-free electric wires and a member containing a vinyl chloride resin. The automotive wiring harness comprises the wire bundle.

15 Claims, 1 Drawing Sheet

FOREIGN PATENT DOCUMENTS

| | | |
|---|---|---|
| JP | 2003-197036 | 7/2003 |
| JP | 2003-226792 | 8/2003 |
| JP | 2004-127791 | 4/2004 |
| JP | 2005-171172 | 6/2005 |

* cited by examiner

HALOGEN FREE ELECTRIC WIRE, WIRE BUNDLE, AND AUTOMOTIVE WIRING HARNESS

RELATED APPLICATIONS

This application is the U.S. National Phase under 35 U.S.C. §371 of International Application No. PCT/JP2005/019068, filed on Oct. 18, 2005, which in turn claims the benefit of Japanese Application Nos. 2004-341762, filed on Nov. 26, 2004 and 2005-205219, filed on Jul. 14, 2005, the disclosures of which Applications are incorporated by reference herein.

TECHNICAL FIELD

The present invention relates to a halogen-free electric wire which can be used in a wiring harness for an automobile or other automotive equipment, a wire bundle including the halogen-free electric wires and a member containing a vinyl chloride resin, and an automotive wiring harness including the wire bundle.

BACKGROUND ART

A wiring harness, which can be used as a wiring component for an automobile or the like, is composed of a wire bundle prepared by bundling a plurality of insulated wires. In general, a wiring harness that is widely used is structured such that a wire bundle is wrapped with a tape having an adhesive material or with a protective sheet, or such that a wire bundle is inserted into an insulative tube so that the outer periphery thereof may be protected therewith.

Hitherto, polyvinyl chloride (PVC)-covered electric wires, which are produced by applying an insulation coating of PVC resin onto the surface of a conductor composed of copper, copper alloy, or the like, have been widely adopted as insulated wires generally used in a wiring harness because these electric wires are excellent in terms of various properties, such as flame retardant property, electrical properties, mechanical properties, flexibility, and processability. However, the coating formed of a PVC resin contains a halogen element, and consequently a halogen gas, which causes an environmental pollution, is emitted during discarding incineration of electric wires or in case of a fire. Therefore, from the viewpoint of protection of the terrestrial environment, electric wires insulated with a halogen-free covering material (halogen-free electric wires) have recently been proposed and practically used instead of the PVC-covered electric wires.

Halogen-free polymers such as polyolefin resins are used for the halogen-free covering material (insulating coating). However, since the flame retardancy of these polyolefin resins is inferior to that of the PVC resin, a flame retardant such as magnesium hydroxide is mixed with the resins in order to improve the flame retardancy. For example, Japanese Unexamined Patent Application Publication No. 2003-226792 describes a flame retardant resin composition prepared by mixing a polymer composed of a propylene/ethylene-propylene block copolymer and a reactive polymer with metal hydroxide or the like (claim 1) and an electric wire including the resin composition as a covering material (claim 3). Examples in which magnesium hydroxide is used as the metal hydroxide are also described (Tables I to IV).

Thus, halogen-free electric wire having excellent flame retardant property can be produced and a wire bundle prepared by bundling only such halogen-free electric wire are used in some cases. However, since the PVC-covered electric wire is superior to the halogen-free electric wire in terms of processability and economic efficiency, a wire bundle including both PVC-covered electric wires and halogen-free electric wires are also used for a wiring harness and the like so that the excellent features as those of the PVC-covered electric wire and the reduction in the emission quantity of a halogen-based gas can both be attained. In addition, materials containing a PVC resin as a main component are generally used as bundling materials such as a tape, a protective material sheet, and an insulating tube that are used for bundling wires or protecting the bundled wires.

However, it has been a problem that when the halogen-free electric wire and the PVC-covered electric wire are used together, or when a PVC resin is used for the bundling material, the life of the halogen-free electric wire is shortened if the halogen-free electric wire and a PVC-containing member contact each other, thereby the degradation of the covering material of the halogen-free electric wire being caused, resulting in cracks, breakage, or the like. Accordingly, it has been sought to develop a halogen-free electric wire having a covering material which does not suffer from reduction in the life thereof even if the covering material is in contact with a member containing a PVC resin. Patent Document 1: Japanese Unexamined Patent Application Publication No. 2003-226792 (claim 1, claim 3, and Tables I to IV)

DISCLOSURE OF INVENTION

Problems to be Solved by the Invention

It is an object of the present invention to provide a halogen-free electric wire having an insulation coating the life of which will not be reduced much even when the insulation coating is in contact with a member containing a PVC resin. Furthermore, it is another object of the present invention to provide a wire bundle in which a halogen-free electric wire is used together with an electric wire having a covering material made of a PVC resin (i.e., PVC-covered electric wire) or together with a bundling material containing a PVC resin and in which the life of the covering material of the halogen-free electric wire will not be shortened much even if it is in contact with a material containing a PVC resin. It is yet another object of the present invention to provide an automotive wiring harness comprising such wire bundle having superior properties.

Means for Solving the Problems

The present inventor has conducted various experiments and intensive studies and found that when the halogen-free electric wire is in contact with a PVC-covered electric wire or a bundling material composed of a PVC resin, the degree of degradation of a covering material of the halogen-free electric wire depends on the type of a flame retardant contained in the covering material and that a shortening of the life of the halogen-free electric wire can be markedly suppressed when aluminum hydroxide is used as the flame retardant. Based on such finding, the present invention was completed.

BRIEF DESCRIPTION OF THE DRAWINGS

In FIG. 1, a wire bundle 1 according to one aspect of the present application is depicted. The wire bundle 1 includes halogen-free electric wire 3 and electric wires 4. Electric wires 4 have a conductor and a covering material having an outermost layer containing polyvinyl chloride (PVC). Bundling material 5 bundles electric wires 4 or protects the outer periphery of the wire bundle 1. In FIG. 2, a wire bundle 2 according to another aspect of the present application is depicted. The wire bundle 2 includes halogen-free electric wires 6. Bundling material 7 contains a PVC resin and bundles halogen-free electric wire 6. An outer periphery of wire bundle 2 is protected with, for example, an insulative tube 8 containing a PVC resin.

Figure 1:
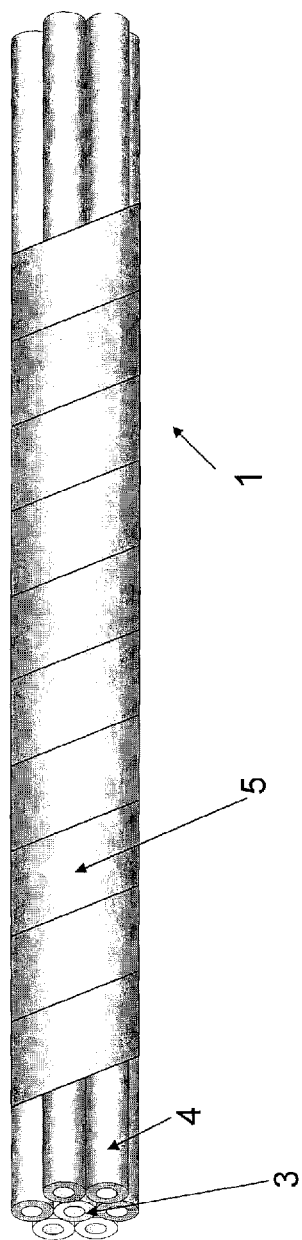
FIG. 1 is an example of a wire bundle according to a one aspect of the present application.
Figure 2:
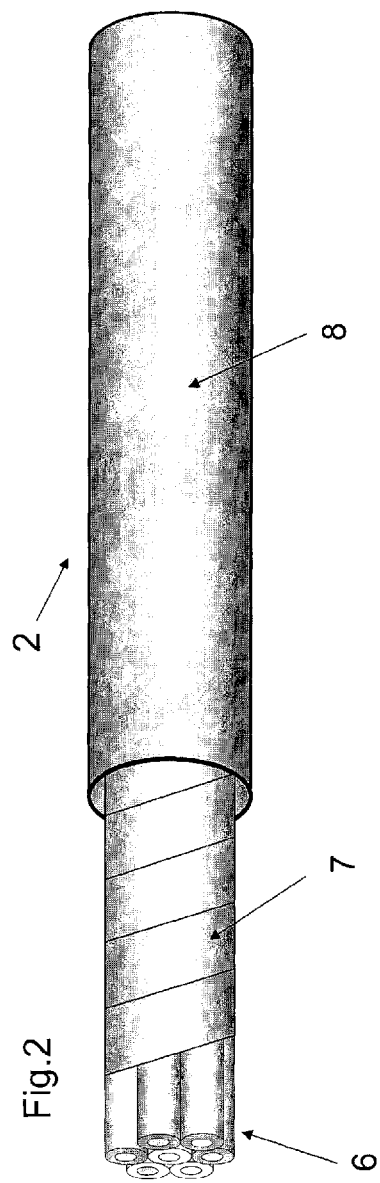
FIG. 2 is an example of a wire bundle according to another aspect of the present application.

The present invention provides, as claim 1, a halogen-free electric wire having a conductor and a covering material disposed on the outer surface of the conductor, wherein the covering material contains a polyolefin resin and a flame retardant, and the flame retardant contains aluminum hydroxide as a main component. With the halogen-free electric wire, the above-described object is achieved, since the halogen-free electric wire substantially does not suffer from a shortening of the life of the covering material thereof even if the halogen-free electric wire is in contact with a PVC resin or the like.

Thus, the halogen-free electric wire of the present invention is characterized in that the covering material for covering the outer surface of the conductor composed of copper, a copper alloy, or the like, includes a polyolefin resin and a flame retardant which contains aluminum hydroxide as the main component. The polyolefin-based resins are, for example, polyethylene such as high-density polyethylene, linear low-density polyethylene, low-density polyethylene, or ultra-low-density polyethylene; polybutene; ethylene copolymer such as ethylene-vinyl acetate copolymer, ethylene-ethyl acrylate copolymer, ethylene-methyl acrylate copolymer, or ethylene-methyl methacrylate copolymer; polypropylene; olefin-based elastomer such as polypropylene-ethylene/propylene copolymer; and polystyrene-based elastomer. These polymers may be used alone or in a mixture of two or more polymers.

The flame retardant contains aluminum hydroxide as a main component. Herein, the phrase "contains aluminum hydroxide as a main component" means that the aluminum hydroxide is the largest among the contents of the flame retardant components and that the ratio of the aluminum hydroxide to the total amount of the flame retardant is 50 weight percent or more. In particular, it is preferable that the flame retardant contain aluminum hydroxide at a ratio of 80 weight percent or more, since in such a case, the shortening of the life of the covering material can be markedly decreased even when the halogen-free electric wire is in contact with a PVC resin or the like. Claim 2 corresponds to this preferred embodiment.

In the flame retardant, another component other than aluminum hydroxide, for example, magnesium hydroxide can be used in combination, provided that the quantity thereof is preferably less than 20 weight percent. In the case where the quantity of the other component such as magnesium hydroxide is increased, thermal aging is thereby significantly accelerated, resulting in the decrease of heat resistance, if the covering material of the halogen-free electric wire is in contact with PVC resin existing in the surface of an electric wire used together or PVC resin existing in the surface of the bundling material. In particular, when the content of the other component is 20 weight percent or more, this tendency becomes significant.

Aluminum hydroxide in the flame retardant preferably has an average particle size in the range of 0.1 to 10 μm, and more preferably in the range of 0.5 to 3 μm. A surface treatment of aluminum hydroxide particles may be performed if it is necessary in order to improve mechanical and physical properties of aluminum hydroxide, for example.

This surface treatment can be performed by a dry process or a wet process using a fatty acid, a silane coupling agent, a titanium coupling agent, an aluminum coupling agent, or the like. These surface treatment reagents may be added at a time when aluminum hydroxide (flame retardant) is mixed in the polyolefin resin.

The content of the flame retardant in the covering material is preferably in the range of 10 to 300 parts by weight relative to 100 parts by weight of the polyolefin resin in the covering material. If the quantity of the flame retardant is less than 10 parts by weight, the flame retardancy capable of self-extinguishment cannot be obtained in some cases. On the other hand, when the content of the flame retardant exceeds 300 parts by weight, the abrasion resistance and the mechanical strength, such as the tensile strength, of the covering material may be degraded. More preferably, the content of the flame retardant in the covering material is in the range of 30 to 150 parts by weight. Claim 3 corresponds to this more preferred embodiment.

In the covering material of the halogen-free electric wire of the present invention, an antioxidant, a metal deactivator, and the like are usually mixed in addition to the polyolefin resin and the flame retardant. If necessary, a flame-retardant aid, a stabilizer, a filler, a reinforcing filler, a lubricant, a cross-linking promoter, a coloring agent, or the like may also be mixed in the covering material. The antioxidant is, for example, a phenol-based or amine-based antioxidant. Adding an antioxidant or a metal deactivator makes it possible to decrease the thermal aging of the covering material of the halogen-free electric wire in the case of its sole existence, that is, the thermal aging of the covering material that may otherwise occur under the conditions where the covering material is not in contact with a member containing a PVC resin.

Furthermore, a stabilizer that is generally added to a PVC resin composition may be mixed in the covering material of the halogen-free electric wire of the present invention so that a member containing a PVC resin may not suffer from the degradation otherwise caused by contact with the halogen-free electric wire of the present invention. Examples of the stabilizer include calcium/zinc system stabilizers, tin stabilizers, and phosphorus or phosphate stabilizers.

The covering material of the halogen-free electric wire of the present invention can be formed with a melt extruder by extruding a resin composition containing the above-mentioned components onto a conductor. The components can be mixed using a known apparatus such as an open roll mixer, a Banbury mixer, a pressure kneader, a single-screw melt extruder, or a twin-screw melt extruder.

The polyolefin resin in the covering material of the halogen-free electric wire of the present invention is preferably cross-linked. As in the case of the PVC-covered electric wire, the cross-linking treatment of the polyolefin resin improves the heat resistance of the covering material, and consequently, the covering material will not melt even when the covering material is heated to the melting point thereof or higher. Furthermore, the abrasion resistance and the mechanical strength, such as the tensile strength, of the covering material are preferably increased. Claim 4 corresponds to this preferred embodiment.

The method of cross-linking treatment of the polyolefin resin in the covering material is, for example, a method in which ionizing radiation such as an accelerated electron beam or gamma rays is irradiated onto the above-described covering material layer prepared by covering the conductor with the resin composition; or a method in which the cross-linking treatment is done with silane cross-linking, for example, using a polyolefin resin prepared by grafting a vinyl silane monomer in advance or a polyolefin resin prepared by grafting a vinyl silane monomer during extrusion. In the method of irradiating ionizing radiation, a cross-linking promoter such as trimethylolpropane trimethacrylate may be added in order to accelerate the cross-linking.

The above-mentioned halogen-free electric wire of the present invention can be adopted for forming a wire bundle in which a plurality of halogen electric wires are bundled together or in which the halogen electric wires are bundled together with other electric wires, for example, PVC-covered electric wires. The wire bundle thus prepared can be used as a wiring harness for an automobile. The superior effect of the present invention can be exhibited particularly when the halogen-free electric wires of the present invention are used in a wire bundle together with PVC-covered electric wires having a covering material whose outermost layer contains a PVC resin.

That is, the wire bundle thus prepared exhibits superior performance: it has the same excellent properties as the PVC-covered electric wire; and the covering material of the halogen-free electric wire is not degraded and the life of the electric wire is not decreased even when the covering material of the halogen-free electric wire is in contact with the PVC resin existing in the outermost layer of the covering material of a PVC-covered electric wire. Claim 5, which corresponds to an embodiment of a wire bundle that can exhibit such superior performance, provides a wire bundle including the above-described halogen-free electric wires in combination with an electric wire comprising a conductor and a covering thereon, the outermost covering layer of which contains a PVC resin.

The excellent advantages of the present invention can also be markedly achieved when a wire bundle including the halogen-free electric wires of the present invention are bundled with a tape or a sheet containing a PVC resin, or when the outer periphery of a wire bundle is protected with, for example, an insulative tube containing a PVC resin. Claim 6, which pertains to an embodiment of such wire bundle, provides a wire bundle including the halogen-free electric wires of the present invention, wherein a bundling material containing a PVC resin bundles the electric wires or protects the outer periphery of the wire bundle. Herein, the wire bundle including the halogen-free electric wires means not only a wire bundle that is solely composed of the halogen-free electric wires, but also a wire bundle that is composed of other kinds of electric wires as well as the halogen-free electric wires.

Claim 7 of the present invention provides an automotive wiring harness comprising a wire bundle having the above-described excellent features. This automotive wiring harness is most suitable for an automotive application since it uses the halogen-free electric wires and consequently has the following excellent features: the generation of a halogen gas during incineration or the like is lessened; and the thermal aging of the covering material of the halogen-free electric wire due to contact with a PVC resin is decreased, which results in decrease of the shortening of the life thereof.

The best mode for carrying out the present invention will now be described by way of examples. The present invention is not limited to the examples.

[Preparation of PVC-covered Electric Wire]

One hundred parts by weight of a PVC resin (degree of polymerization: 2,500, manufactured by Shin Dai-Ichi Vinyl Corporation, trade name: ZEST2500), 5 parts by weight of a Ca/Zn system stabilizer (manufactured by ASAHI DENKA Co., Ltd., trade name: RUP109), 50 parts by weight of trioctyl trimellitate, 5 parts by weight of trimethylolpropane trimethacrylate, 3 parts by weight of antimony trioxide, and 10 parts by weight of heavy calcium carbonate were subjected to melt mixing with a Banbury mixer. The resulting PVC composition was pelletized with a Feeder-Ruder.

The pellets of the PVC composition were extruded, with a melt extruder (50 mm in diameter, L/D=24), onto an annealed copper stranded wire conductor (37/0.32) so as to form an insulating coating of 0.7 mm in thickness. Subsequently, electron beams were irradiated at 100 kGy onto the coating with an accelerating voltage of 2 MeV, whereby a cross-linked PVC electric wire was prepared.

[Materials Used in Examples and Comparative Examples]

The materials used in the following examples and comparative examples were as follows:

Ethylene-ethyl acrylate copolymer/the quantity of ethyl acrylate: 15 weight percent, melt flow rate: 0.8 (manufactured by Japan Polyethylene Corporation, trade name: REXPEARL A1150); Ethylene-methyl methacrylate copolymer/the quantity of methyl methacrylate: 20 weight percent, melt flow rate: 3 (manufactured by Sumitomo Chemical Co., Ltd., trade name: ACRYFT WH202); Ethylene-vinyl acetate copolymer/the quantity of vinyl acetate: 15 weight percent, melt flow rate: 1.5 (manufactured by Sumitomo Chemical Co., Ltd., trade name: EVATATE H2020).

Aluminum hydroxide A/manufactured by SHOWA DENKO K.K., trade name: HIGILITE H42STV (surface silane treatment); Aluminum hydroxide B/manufactured by SHOWA DENKO K.K., trade name: HIGILITE H42S (surface fatty acid treatment); Aluminum hydroxide C/manufactured by SHOWA DENKO K.K., trade name: HIGILITE H42 (non-surface treatment).

Magnesium hydroxide A manufactured by Kyowa Chemical Industry Co., Ltd., trade name: KISUMA 5 (non-surface treatment); Magnesium hydroxide B/manufactured by Kyowa Chemical Industry Co., Ltd., trade name: KISUMA 5A (surface fatty acid treatment); Magnesium hydroxide C/manufactured by Kyowa Chemical Industry Co., Ltd., trade name: KISUMA 5SDF (surface silane treatment).

Antioxidant: phenol-based oxidation inhibitor manufactured by Ciba Specialty Chemicals K.K., trade name: Irganox 1010; Metal deactivator: manufactured by ASAHI DENKA Co., Ltd., trade name: ADK STAB CDA-1; Cross-linking promoter: trimethylolpropane trimethacrylate.

EXAMPLE 1

Preparation of Halogen-free Electric Wire

A resin composition including 100 parts by weight of the ethylene-ethyl acrylate copolymer, 70 parts by weight of aluminum hydroxide A, 4 parts by weight of the antioxidant, 1 part by weight of the metal deactivator, and 2 parts by weight of the cross-linking promoter (trimethylolpropane trimethacrylate) was subjected to melt mixing with a Banbury mixer. The resulting halogen-free polyolefin resin composition was pelletized with a Feeder-Ruder.

The pellets of the zero-halogen composition were extruded onto an annealed copper stranded wire conductor (37/0.32) with a melt extruder (50 mm in diameter, L/D=24) so that the thickness of the insulating coating was 0.7 mm. Subsequently, electron beams were irradiated at 200 kGy onto the coating with an accelerating voltage of 2 MeV. Thus, an electric wire having a cross-linked halogen-free insulation coating was produced.

EXAMPLE 2

An electric wire having a cross-linked halogen-free insulation coating was produced as in Example 1 except that the contents of the resin composition were changed to: 100 parts by weight of the ethylene-ethyl acrylate copolymer, 100 parts by weight of aluminum hydroxide A, 4 parts by weight of the antioxidant, 1 part by weight of the metal deactivator, and 2 parts by weight of the cross-linking promoter (trimethylolpropane trimethacrylate).

EXAMPLE 3

An electric wire having a cross-linked halogen-free insulation coating was produced as in Example 1 except that the contents of the resin composition were changed to: 100 parts by weight of the ethylene-ethyl acrylate copolymer, 100 parts by weight of aluminum hydroxide B, 4 parts by weight of the antioxidant, 1 part by weight of the metal deactivator, and 2 parts by weight of the cross-linking promoter (trimethylolpropane trimethacrylate).

EXAMPLE 4

An electric wire having a cross-linked halogen-free insulation coating was produced as in Example 1 except that the contents of the resin composition were changed to: 100 parts by weight of the ethylene-ethyl acrylate copolymer, 70 parts by weight of aluminum hydroxide C, 4 parts by weight of the antioxidant, and 1 part by weight of the metal deactivator.

EXAMPLE 5

An electric wire having a cross-linked halogen-free insulation coating was produced as in Example 1 except that the contents of the resin composition were changed to: 100 parts by weight of the ethylene-ethyl acrylate copolymer, 70 parts by weight of aluminum hydroxide C, and 4 parts by weight of the antioxidant.

EXAMPLE 6

An electric wire having a cross-linked halogen-free insulation coating was produced as in Example 1 except that the contents of the resin composition were changed to: 100 parts by weight of the ethylene-ethyl acrylate copolymer, 60 parts by weight of aluminum hydroxide C, 10 parts by weight of magnesium hydroxide A, 4 parts by weight of the antioxidant, 1 part by weight of the metal deactivator, and 2 parts by weight of the cross-linking promoter (trimethylolpropane trimethacrylate).

EXAMPLE 7

An electric wire having a cross-linked halogen-free insulation coating was produced as in Example 1 except that the contents of the resin composition were changed to: 100 parts by weight of the ethylene-ethyl acrylate copolymer, 70 parts by weight of aluminum hydroxide C, 4 parts by weight of the antioxidant, 1 part by weight of the metal deactivator, and 2 parts by weight of the cross-linking promoter (trimethylolpropane trimethacrylate).

EXAMPLE 8

An electric wire having a cross-linked halogen-free insulation coating was produced as in Example 1 except that the contents of the resin composition were changed to: 100 parts by weight of the ethylene-vinyl acetate copolymer, 70 parts by weight of aluminum hydroxide A, 4 parts by weight of the antioxidant, and 1 part by weight of the metal deactivator, and that the irradiation amount of the electron beam was 150 kGy.

EXAMPLE 9

An electric wire having a cross-linked halogen-free insulation coating was produced as in Example 8 except that the contents of the resin composition were changed to: 100 parts by weight of the ethylene-vinyl acetate copolymer, 100 parts by weight of aluminum hydroxide B, 4 parts by weight of the antioxidant, and 1 part by weight of the metal deactivator.

EXAMPLE 10

An electric wire having a cross-linked halogen-free insulation coating was produced as in Example 8 except that the contents of the resin composition were changed to: 100 parts by weight of the ethylene-vinyl acetate copolymer, 70 parts by weight of aluminum hydroxide C, 4 parts by weight of the antioxidant, and 1 part by weight of the metal deactivator.

EXAMPLE 11

An electric wire having a cross-linked halogen-free insulation coating was produced as in Example 1 except that the contents of the resin composition were changed to: 100 parts by weight of the ethylene-methyl methacrylate copolymer, 100 parts by weight of aluminum hydroxide A, 4 parts by weight of the antioxidant, and 1 part by weight of the metal deactivator, and that the irradiation amount of the electron beam was 250 kGy.

EXAMPLE 12

An electric wire having a cross-linked halogen-free insulation coating was produced as in Example 11 except that the contents of the resin composition were changed to: 100 parts by weight of the ethylene-methyl methacrylate copolymer, 150 parts by weight of aluminum hydroxide A, 4 parts by weight of the antioxidant, and 1 part by weight of the metal deactivator.

EXAMPLE 13

An electric wire having a cross-linked halogen-free insulation coating was produced as in Example 8 except that the contents of the resin composition were changed to: 100 parts by weight of the ethylene-vinyl acetate copolymer, 45 parts by weight of aluminum hydroxide C, 35 parts by weight of magnesium hydroxide A, 4 parts by weight of the antioxidant, and 1 part by weight of the metal deactivator.

EXAMPLE 14

An electric wire having a cross-linked halogen-free insulation coating was produced as in Example 11 except that the contents of the resin composition were changed to: 100 parts by weight of the ethylene-methyl methacrylate copolymer, 80 parts by weight of aluminum hydroxide C, 4 parts by weight of the antioxidant, and 1 part by weight of the metal deactivator, and that 3 parts by weight of a calcium/zinc stabilizer (trade name: RUP140SE, manufactured by ASAHI DENKA Co., Ltd.), which is used as a stabilizer for PVC resin compositions, was further added thereto.

COMPARATIVE EXAMPLE 1

An electric wire having a cross-linked halogen-free insulation coating was produced as in Example 1 except that the contents of the resin composition were changed to: 100 parts by weight of the ethylene-ethyl acrylate copolymer, 70 parts by weight of magnesium hydroxide A, 1 part by weight of the antioxidant, 0.5 parts by weight of the metal deactivator, and 2 parts by weight of the cross-linking promoter (trimethylolpropane trimethacrylate).

COMPARATIVE EXAMPLE 2

An electric wire having a cross-linked halogen-free insulation coating was produced as in Example 1 except that the contents of the resin composition were changed to: 100 parts by weight of the ethylene-ethyl acrylate copolymer, 70 parts by weight of magnesium hydroxide A, 2 parts by weight of the antioxidant, 0.5 parts by weight of the metal deactivator, and 2 parts by weight of the cross-linking promoter (trimethylolpropane trimethacrylate).

COMPARATIVE EXAMPLE 3

An electric wire having a cross-linked halogen-free insulation coating was produced as in Example 1 except that the contents of the resin composition were changed to: 100 parts by weight of the ethylene-ethyl acrylate copolymer, 70 parts by weight of magnesium hydroxide A, 4 parts by weight of the antioxidant, 1 part by weight of the metal deactivator, and 2 parts by weight of the cross-linking promoter (trimethylolpropane trimethacrylate).

COMPARATIVE EXAMPLE 4

An electric wire having a cross-linked halogen-free insulation coating was produced as in Example 1 except that the contents of the resin composition were changed to: 100 parts by weight of the ethylene-ethyl acrylate copolymer, 70 parts by weight of magnesium hydroxide B, 4 parts by weight of the antioxidant, 1 part by weight of the metal deactivator, and 2 parts by weight of the cross-linking promoter (trimethylolpropane trimethacrylate).

COMPARATIVE EXAMPLE 5

An electric wire having a cross-linked halogen-free insulation coating was produced as in Example 8 except that the contents of the resin composition were changed to: 100 parts by weight of the ethylene-vinyl acetate copolymer, 70 parts by weight of magnesium hydroxide C, 4 parts by weight of the antioxidant, and 1 part by weight of the metal deactivator.

COMPARATIVE EXAMPLE 6

An electric wire having a cross-linked halogen-free insulation coating was produced as in Example 9 except that the contents of the resin composition were changed to: 100 parts by weight of the ethylene-vinyl acetate copolymer, 100 parts by weight of magnesium hydroxide B, 4 parts by weight of the antioxidant, and 1 part by weight of the metal deactivator.

COMPARATIVE EXAMPLE 7

An electric wire having a cross-linked halogen-free insulation coating was produced as in Example 10 except that the contents of the resin composition were changed to: 100 parts by weight of the ethylene-vinyl acetate copolymer, 70 parts by weight of magnesium hydroxide A, 4 parts by weight of the antioxidant, and 1 part by weight of the metal deactivator.

COMPARATIVE EXAMPLE 8

An electric wire having a cross-linked halogen-free insulation coating was produced as in Example 11 except that the contents of the resin composition were changed to: 100 parts by weight of the ethylene-methyl methacrylate copolymer, 100 parts by weight of magnesium hydroxide C, 4 parts by weight of the antioxidant, and 1 part by weight of the metal deactivator.

COMPARATIVE EXAMPLE 9

An electric wire having a cross-linked halogen-free insulation coating was produced as in Example 12 except that the contents of the resin composition were changed to: 100 parts by weight of the ethylene-methyl methacrylate copolymer, 150 parts by weight of magnesium hydroxide C, 4 parts by weight of the antioxidant, and 1 part by weight of the metal deactivator.

The characteristics of the cross-linked halogen-free electric wires prepared in Examples 1 to 14 and Comparative Examples 1 to 9 were evaluated as follows. Tables I to V shows the results.

[Evaluation of Characteristics]
[Heat Resistance a] (Thermal Aging in the Case of Non-contact with a Member Containing a PVC Resin.)

The conductor was pulled out from each electric wire having a cross-linked halogen-free insulation coating, and the tubular covering material was cut into pieces having a length of 150 mm. The tubular covering materials were aged in a Geer oven under specified aging conditions so as to prepare test pieces. The test pieces were provided with marks with intervals of 50 mm at the central part thereof and stretched with a tensile tester at a rate of 200 mm/min. Thus, the elongation of the test pieces was measured at the time of breakage thereof.

[Heat Resistance B] (Thermal Aging in the Case of Contact with a Member Containing a PVC Resin.)

An electric wire having a halogen-free insulation coating and six cross-linked PVC electric wires mentioned above were cut into pieces each having a length of 300 mm. The wire pieces thus prepared were bundled such that the electric wire having a cross-linked halogen-free insulation was disposed at the center, and the outer periphery of the wire bundle was wrapped with a cross-linked PVC adhesive tape so as to be pressed with it. The harness-shaped samples thus prepared were aged in a Geer oven under specified aging conditions. Subsequently, the samples were disassembled to take out the electric wires having a halogen-free cross-linked insulation coating. The so-aged electric wires having a cross-linked halogen-free insulation coating were wound around a mandrel having the same diameter as that of the so-aged electric wires, and were inspected as to the occurrence of cracks and breakings on the surface thereof.

[Flame Retardancy]

The flame retardancy test was conducted based on the standard of ISO 6722:2002. The test samples were prepared by cutting each electric wire having a cross-linked halogen-free insulation into pieces having a length of 600 mm. A Bunsen burner with a caliber of 9 mm was adjusted so that the entire length of the flame was 100 mm and the length of the reduction fire was 50 mm. Each test piece was held with an angle of inclination of 45 degrees and was brought into contact with the flame for 30 seconds such that the leading end of the reduction fire of the Bunsen burner was in contact with the test piece. After the flame was removed, the flame-remaining time was measured. A sample having a flame-remaining time of 70 seconds or less was evaluated as "acceptable".

TABLE I

|  |  | Example 1 | Example 2 | Example 3 | Example 4 | Example 5 |
|---|---|---|---|---|---|---|
| Ethylene-ethyl acrylate copolymer |  | 100 | 100 | 100 | 100 | 100 |
| Ethylene-vinyl acetate copolymer |  |  |  |  |  |  |
| Ethylene-methyl methacrylate copolymer |  |  |  |  |  |  |
| Aluminum hydroxide A |  | 70 | 100 |  |  |  |
| Aluminum hydroxide B |  |  |  | 100 |  |  |
| Aluminum hydroxide C |  |  |  |  | 70 | 70 |
| Magnesium hydroxide A |  |  |  |  |  |  |
| Magnesium hydroxide B |  |  |  |  |  |  |
| Magnesium hydroxide C |  |  |  |  |  |  |
| Antioxidant |  | 4 | 4 | 4 | 4 | 4 |
| Metal deactivator |  | 1 | 1 | 1 | 1 |  |
| Cross-linking promoter |  | 2 | 2 | 2 |  |  |
| Dose of electron beam kGy |  | 200 | 200 | 200 | 200 | 200 |
| Total |  | 177.0 | 207.0 | 207.0 | 175.0 | 174.0 |
| Item |  | Aging condition |  |  |  |  |
| Heat resistance A | 180° C. × 14 days | 223 | 142 | 162 | 39 | 15 |
|  | 180° C. × 21 days | 7 | 3 | 84 | 12 | 2 |
| Heat resistance B | 150° C. × 14 days | Satisfactory | Satisfactory | Satisfactory | Satisfactory | Satisfactory |
|  | 150° C. × 21 days | Satisfactory | Satisfactory | Satisfactory | Satisfactory | Satisfactory |
|  | 150° C. × 42 days | Satisfactory | Satisfactory | Satisfactory | Satisfactory | Satisfactory |
| Flame retardancy | Flame-remaining time (sec) | 29 | 23 | 21 | 31 | 33 |
|  |  | Acceptable | Acceptable | Acceptable | Acceptable | Acceptable |

TABLE II

|  |  | Example 6 | Example 7 | Example 8 | Example 9 | Example 10 |
|---|---|---|---|---|---|---|
| Ethylene-ethyl acrylate copolymer |  | 100 | 100 |  |  |  |
| Ethylene-vinyl acetate copolymer |  |  |  | 100 | 100 | 100 |
| Ethylene-methyl methacrylate copolymer |  |  |  |  |  |  |
| Aluminum hydroxide A |  |  |  | 70 |  |  |
| Aluminum hydroxide B |  |  |  |  | 100 |  |
| Aluminum hydroxide C |  | 60 | 70 |  |  | 70 |
| Magnesium hydroxide A |  | 10 |  |  |  |  |
| Magnesium hydroxide B |  |  |  |  |  |  |
| Magnesium hydroxide C |  |  |  |  |  |  |
| Antioxidant |  | 4 | 4 | 4 | 4 | 4 |
| Metal deactivator |  | 1 | 1 | 1 | 1 | 1 |
| Cross-linking promoter |  | 2 | 2 |  |  |  |
| Dose of electron beam kGy |  | 200 | 200 | 150 | 150 | 150 |
| Total |  | 177.0 | 177.0 | 175.0 | 205.0 | 175.0 |
| Item |  | Aging condition |  |  |  |  |
| Heat resistance A | 180° C. × 14 days | 315 | 238 | 170 | 196 | 215 |
|  | 180° C. × 21 days | 16 | 4 | 42 | 58 | 38 |
| Heat resistance B | 150° C. × 14 days | Satisfactory | Satisfactory | Satisfactory | Satisfactory | Satisfactory |
|  | 150° C. × 21 days | Satisfactory | Satisfactory | Satisfactory | Satisfactory | Satisfactory |
|  | 150° C. × 42 days | Satisfactory | Satisfactory | Satisfactory | Satisfactory | Satisfactory |
| Flame retardancy | Flame-remaining time (sec) | 28 | 28 | 23 | 17 | 29 |
|  |  | Acceptable | Acceptable | Acceptable | Acceptable | Acceptable |

TABLE III

|  | Example 11 | Example 12 | Example 13 | Example 14 |
|---|---|---|---|---|
| Ethylene-ethyl acrylate copolymer |  |  |  |  |
| Ethylene-vinyl acetate copolymer |  |  |  | 100 |

TABLE III-continued

|  |  | Example 11 | Example 12 | Example 13 | Example 14 |
|---|---|---|---|---|---|
| Ethylene-methyl methacrylate copolymer |  | 100 | 100 |  | 100 |
| Aluminum hydroxide A |  | 100 | 150 |  |  |
| Aluminum hydroxide B |  |  |  |  |  |
| Aluminum hydroxide C |  |  |  | 45 | 80 |
| Magnesium hydroxide A |  |  |  | 35 |  |
| Magnesium hydroxide B |  |  |  |  |  |
| Magnesium hydroxide C |  |  |  |  |  |
| Antioxidant |  | 4 | 4 | 4 | 4 |
| Metal deactivator |  | 1 | 1 | 1 | 1 |
| Stabilizer (*) |  |  |  |  | 3 |
| Dose of electron beam kGy |  | 250 | 250 | 150 | 250 |
| Total |  | 205.0 | 255.0 | 185 | 188 |
| Item |  | Aging condition | | | |
| Heat resistance A | 180° C. × 14 days | 162 | 91 | 201 | 183 |
|  | 180° C. × 21 days | 66 | 4 | 48 | 53 |
| Heat resistance B | 150° C. × 14 days | Satisfactory | Satisfactory | Satisfactory | Satisfactory |
|  | 150° C. × 21 days | Satisfactory | Satisfactory | Satisfactory | Satisfactory |
|  | 150° C. × 42 days | Satisfactory | Satisfactory | Satisfactory | Satisfactory |
| Flame retardancy | Flame-remaining time (sec) | 38 | 19 | 13 | 18 |
|  |  | Acceptable | Acceptable | Acceptable | Acceptable |

(*) calcium/zinc system stabilizer (trade name: RUP140SE, manufactured by ASAHI DENKA Co., Ltd.)

TABLE IV

|  |  | Comparative Example 1 | Comparative Example 2 | Comparative Example 3 | Comparative Example 4 |
|---|---|---|---|---|---|
| Ethylene-ethyl acrylate copolymer |  | 100 | 100 | 100 | 100 |
| Ethylene-vinyl acetate copolymer |  |  |  |  |  |
| Ethylene-methyl methacrylate copolymer |  |  |  |  |  |
| Aluminum hydroxide A |  |  |  |  |  |
| Aluminum hydroxide B |  |  |  |  |  |
| Aluminum hydroxide C |  |  |  |  |  |
| Magnesium hydroxide A |  | 70 | 70 | 70 |  |
| Magnesium hydroxide B |  |  |  |  | 70 |
| Magnesium hydroxide C |  |  |  |  |  |
| Antioxidant |  | 1 | 2 | 4 | 4 |
| Metal deactivator |  | 0.5 | 0.5 | 1 | 1 |
| Cross-linking promoter |  | 2 | 2 | 2 | 2 |
| Dose of electron beam kGy |  | 200 | 200 | 200 | 200 |
| Total |  | 173.5 | 174.5 | 177.0 | 177.0 |
| Item |  | Aging condition | | | |
| Heat resistance A | 180° C. × 14 days | 10 | 12 | 259 | 150 |
|  | 180° C. × 21 days | 1 | 2 | 85 | 136 |
| Heat resistance B | 150° C. × 14 days | Satisfactory | Satisfactory | Satisfactory | Satisfactory |
|  | 150° C. × 21 days | Cracks | Cracks | Cracks | Cracks |
|  | 150° C. × 42 days | Breaking | Breaking | Breaking | Breaking |
| Flame retardancy | Flame-remaining time (sec) | 14 | 17 | 15 | 27 |
|  |  | Acceptable | Acceptable | Acceptable | Acceptable |

TABLE V

|  | Comparative Example 5 | Comparative Example 6 | Comparative Example 7 | Comparative Example 8 | Comparative Example 9 |
|---|---|---|---|---|---|
| Ethylene-ethyl acrylate copolymer |  |  |  |  |  |
| Ethylene-vinyl acetate copolymer | 100 | 100 | 100 |  |  |
| Ethylene-methyl methacrylate copolymer |  |  |  | 100 | 100 |
| Aluminum hydroxide A |  |  |  |  |  |
| Aluminum hydroxide B |  |  |  |  |  |
| Aluminum hydroxide C |  |  |  |  |  |
| Magnesium hydroxide A |  |  | 70 |  |  |

TABLE V-continued

|  |  | Comparative Example 5 | Comparative Example 6 | Comparative Example 7 | Comparative Example 8 | Comparative Example 9 |
| --- | --- | --- | --- | --- | --- | --- |
| Magnesium hydroxide B |  |  | 100 |  |  |  |
| Magnesium hydroxide C |  | 70 |  |  | 100 | 150 |
| Antioxidant |  | 4 | 4 | 4 | 4 | 4 |
| Metal deactivator |  | 1 | 1 | 1 | 1 | 1 |
| Cross-linking promoter |  |  |  |  |  |  |
| Dose of electron beam kGy |  | 150 | 150 | 150 | 250 | 250 |
| Total |  | 175.0 | 205.0 | 175.0 | 205.0 | 255.0 |
| Item |  | Aging condition |  |  |  |  |
| Heat resistance A | 180° C. × 14 days | 186 | 127 | 164 | 182 | 103 |
|  | 180° C. × 21 days | 63 | 40 | 58 | 39 | 8 |
| Heat resistance B | 150° C. × 14 days | Satisfactory | Cracks | Cracks | Satisfactory | Satisfactory |
|  | 150° C. × 21 days | Breaking | Breaking | Breaking | Cracks | Breaking |
|  | 150° C. × 42 days | — | — | — | Breaking | — |
| Flame retardancy | Flame-remaining time (sec) | 16 | 7 | 10 | 24 | 33 |
|  |  | Acceptable | Acceptable | Acceptable | Acceptable | Acceptable |

Comparative Examples 1 to 3 are such that the contents of the antioxidants were altered in the system where the ethylene-ethyl acrylate copolymer was used as the polyolefin resin and a magnesium hydroxide without surface treatment was mixed as a flame retardant. As the quantity of the antioxidant was increased, the heat resistance A (the thermal aging in the case of sole presence of halogen-free electric wires) was improved; however, no improvement of the heat resistance B (the thermal aging in the case of coexistence with the PVC-containing member) was observed.

That is, the heat resistance in the case of coexistence with the PVC-containing member apparently did not change in spite of the increase in the quantity of the antioxidant. According to the description in Patent Document 1 (Japanese Unexamined Patent Application Publication No. 2003-226792), the main cause of degradation of the heat resistance in the case of coexistence with a PVC resin is, as assumed by the inventors of the patent application, that an antioxidant (anti-aging agent) in an electric wire having a halogen-free insulation is extracted by a PVC electric wire so as to be transferred thereto. However, if such a transfer is the sole cause of the degradation in the property of heat resistance, the increase in the amount of the antioxidant should improve the heat resistance to a certain degree. Therefore, it is assumed to be caused apparently by another mechanism different from such a transfer mechanism.

Comparative Example 4 is a case where a magnesium hydroxide subjected to a fatty acid surface treatment is used instead of the magnesium hydroxide without such surface treatment. The elongation of the insulation was improved in the case of the test piece aged at 180° C. for 21 days in the heat resistance A: however, there was no improvement observed in the heat resistance B.

Example 1 is a case in which an aluminum hydroxide subjected to a silane surface treatment (a surface treatment with a silane coupling agent) was used as the flame retardant in the system where the ethylene-ethyl acrylate copolymer was used as the polyolefin resin. In the heat resistance B test, no cracks were generated in the samples aged at 150° C. for 42 days or longer, and thus the samples exhibited excellent heat resistance under the coexistence with the cross-linked PVC. In contrast, cracks were generated in the aging test of 150° C. for 21 days in the case of Comparative Example 3 having the same composition as Example 1 except that a magnesium hydroxide without surface treatment was used instead of the aluminum hydroxide.

Example 2 is a case where the amount of a flame retardant composed of the aluminum hydroxide subjected to the silane surface treatment was increased. The heat resistance A was degraded because of the increase in the amount of the flame retardant; however, the heat resistance B maintained satisfactory results even after the aging of 150° C. for 42 days. Example 3 is a case where the surface treatment of the aluminum hydroxide was conducted with fatty acid instead of the silane coupling agent. Regardless of the types of the surface treatment, satisfactory results were obtained in the heat resistance B tests.

Example 4 is a case where the aluminum hydroxide without surface treatment was used and trimethylolpropane trimethacrylate as a cross-linking promoter was not used. As the degree of cross-linking of the electric wire was decreased, the electric wires exhibited a tendency of increase in the occurrence of surface crack in the above-described bending test conducted using a mandrel having the same diameter as that of the wires; nevertheless, satisfactory results were obtained in the heat resistance B tests.

Example 5 is a case where the metal deactivator was removed from the case of Example 4. Although the heat resistance A was degraded in the aging of 180° C. for 14 days, the heat resistance B maintained sufficient heat resistance.

Example 6 is a case where a mixture of magnesium hydroxide and aluminum hydroxide was used as the flame retardant. When the quantity of the magnesium hydroxide was 10 parts by weight (the ratio of the aluminum hydroxide to the total flame retardant was 86 weight percent, i.e., within the range of the present invention), a satisfactory heat resistance was maintained even in the heat resistance B.

Example 7 is a case where an aluminum hydroxide without surface treatment was used as the flame retardant in the system in which the ethylene-ethyl acrylate copolymer was used as the polyolefin resin. No cracks were generated in the heat resistance B test for samples aged at 150° C. for 42 days or longer, and thus the samples exhibited superior heat resistance in the case of the coexistence with the cross-linked PVC. In contrast, in the case of Comparative Example 3, where the composition was the same as Example 7 except that the aluminum hydroxide without surface treatment was used, cracks were generated in the case of aging at 150° C. for 21 days.

Example 8 is a case where the aluminum hydroxide subjected to the silane surface treatment was used as the flame retardant in the system where the ethylene-vinyl acetate copolymer was used as the polyolefin resin. In the heat resistance B test, no cracks were generated in the case of aging at 150° C. for 42 days or longer, and thus the samples exhibited excellent heat resistance in the case of coexistence with the cross-linked PVC. In contrast, in Comparative Example 5, in which the composition was the same as in Example 8 except that the aluminum hydroxide was replaced with a magnesium hydroxide subjected to a silane surface treatment, breakage was caused in the case of aging at 150° C. for 21 days.

Example 9 is a case where the aluminum hydroxide with the fatty acid surface treatment was used as the flame retardant in the system in which the ethylene-vinyl acetate copolymer was used as the polyolefin resin. In the heat resistance B test, no cracks were generated in the case of aging at 150° C. for 42 days or longer, and thus the samples exhibited excellent heat resistance in the case of coexistence with the cross-linked PVC.

In contrast, in Comparative Example 6, in which the composition was the same as in Example 9 except that the aluminum hydroxide was replaced with the magnesium hydroxide subjected to the fatty acid surface treatment, breakage was caused in the case of aging at 150° C. for 21 days.

Example 10 is a case in which the aluminum hydroxide without surface treatment was used as the flame retardant in the system where the ethylene-vinyl acetate copolymer was used as the polyolefin resin.

In the heat resistance B test, no cracks were generated in the case of aging at 150° C. for 42 days or longer, and thus the samples exhibited excellent heat resistance in the case of coexistence with the cross-linked PVC. In contrast, in Comparative Example 7, where the composition was the same as in Example 10 except that the aluminum hydroxide was replaced with a magnesium hydroxide without surface treatment, breakage was caused in the case of aging at 150° C. for 21 days.

Example 11 is a case in which the aluminum hydroxide with the silane surface treatment was used as the flame retardant in the system where the ethylene-methyl methacrylate copolymer was used as the polyolefin resin. In the heat resistance B test, no cracks were generated in the case of aging at 150° C. for 42 days or longer, and thus the samples exhibited excellent heat resistance in the case of coexistence with the cross-linked PVC. In contrast, in Comparative Example 8, where the composition was the same as in Example 11 except that the aluminum hydroxide was replaced with the magnesium hydroxide with the silane surface treatment, cracks were generated in the case of aging at 150° C. for 21 days and breakage was caused in the case of aging at 150° C. for 42 days.

Example 12 is a case in which the quantity of the aluminum hydroxide with the silane surface treatment was increased for use as the flame retardant in the system where the ethylene-methyl methacrylate copolymer was used as the polyolefin resin. In the heat resistance B test, no cracks were generated in the case of aging at 150° C. for 42 days or longer, and thus the samples exhibited excellent heat resistance in the case of coexistence with the cross-linked PVC. In contrast, in Comparative Example 9, where the composition was the same as in Example 12 except that the aluminum hydroxide was replaced with the magnesium hydroxide with the silane surface treatment, breakage was caused in the case of aging at 150° C. for 21 days.

As is apparent from Examples 7 to 14 and Comparative Examples 3 and 5 to 9, with respect to the heat resistance of the material per se (heat resistance A), the aluminum hydroxide could not be said to be superior, as a composition of the flame retardant, to the magnesium hydroxide; however, under the special conditions in which a PVC electric wire or a PVC resin of a bundling material coexists (heat resistance B), the situation completely differed such that the aluminum hydroxide exhibited superior heat resistance. This is an advantage that cannot be expected from existing knowledge.

ADVANTAGES OF THE INVENTION

The halogen-free electric wire of the present invention less suffers from a reduction in the life of the covering material even if the covering material of the electric wire is in contact with a member containing PVC resin. Accordingly, the degradation of the covering material is lessened even when the halogen-free electric wires are used to form a wire bundle in combination with electric wires including a PVC resin, or even when a wire bundle is formed by bundling the halogen electric wires with a bundling material containing a PVC resin. Since the wire bundle of the present invention has such excellent feature, the automotive wiring harness made of the wire bundle has excellent features such that not only can the generation of a halogen gas during incineration or the like be lessened but also the life of the harness is not degraded. The thermal degradation due to contact with a PVC-resin-containing member cannot be suppressed even by adding an antioxidant or the like; however, the present invention makes it possible to achieve an effect of suppressing such thermal degradation without increasing the quantity of the antioxidant.

The invention claimed is:
1. A wire bundle comprising:
a halogen-free electric wire; and
an electric wire having a conductor and a covering material, the covering material covering the outer surface of the conductor, an outermost layer of the covering material containing cross-linked polyvinyl chloride by being irradiated with ionizing radiation, wherein:
the halogen-free electric wire has a conductor and a covering material, the covering material covering the outer surface of the conductor and including a polyolefin resin and a flame retardant,
the polyolefin resin is cross-linked by being irradiated with ionizing radiation,
the polyolefin resin is selected from a polyethylene, polybutene or ethylene-base polymer,
the quantity of the flame retardant is in the range of 30 to 150 parts by weight relative to 100 parts by weight of the polyolefin resin, and
the flame retardant contains aluminum hydroxide at a ratio of 80 weight percent or more.
2. The wire bundle of claim 1, wherein the aluminum hydroxide in the flame retardant has an average particle size in the range of 0.1 to 10 μm.
3. The wire bundle of claim 1, wherein the aluminum hydroxide in the flame retardant has an average particle size in the range of 0.5 to 3 μm.
4. The wire bundle of claim 1, wherein the flame retardant contains additional flame retardant other than the aluminum hydroxide.
5. The wire bundle of claim 4, wherein the additional flame retardant includes magnesium hydroxide.
6. The wire bundle of claim 1, wherein the covering material of the halogen-free electric wire has thermal durability to satisfy a thermal aging requirement in which no crack or no breaking on the surface is observed after 42 days of contact with a polyvinyl chloride resin at temperature of 150° C.

7. The wire bundle of claim 6, wherein the thermal durability is tested on a condition that:

the halogen-free electric wire and six cross-linked polyvinyl chloride electric wire are cut into pieces each having a length of 300 mm, wherein the halogen-free electric wire is prepared by melt-extruding pellets of a halogen-free composition onto an annealed copper stranded wire conductor so as to form an insulating coating of 0.7 mm in thickness, and then irradiating at 200 kGy onto the coating with electron beams having an accelerating voltage of 2 MeV, and the six cross-linked polyvinyl chloride electric wire are prepared by melt-extruding pellets of a polyvinyl chloride onto an annealed copper stranded wire conductor so as to form an insulating coating of 0.7 mm in thickness, and then irradiating at 100 kGy onto the coating with electron beams having an accelerating voltage of 2 MeV, the wire pieces are bundled in harness-shaped samples such that the halogen-free electric wire is disposed at the center, and the outer periphery of the wire bundle is wrapped with a cross-linked polyvinyl chloride adhesive tape so as to be pressed with it, the samples are aged in a Geer oven for 42 days at temperature of 150° C., the samples are disassembled to take out the halogen-free electric wires, the halogen-free electric wires are wound around a mandrel having the same diameter as that of the halogen-free electric wires, and the halogen-free electric wires are inspected as to the occurrence of cracks and breakings.

8. A wire bundle comprising:

halogen-free electric wires each having a conductor and a covering material, the covering material covering the outer surface of the conductor and including a polyolefin resin and a flame retardant, the polyolefin resin being cross-linked by being irradiated with ionizing radiation, the polyolefin resin is selected from a polyethylene, polybutene or ethylene-base polymer, the quantity of the flame retardant being in the range of 30 to 150 parts by weight relative to 100 parts by weight of the polyolefin resin, the flame retardant containing aluminum hydroxide at a ratio of 80 weight percent or more, wherein a bundling material containing a cross-linked polyvinyl chloride resin, which is cross-linked by being irradiated with ionizing radiation, bundles the electric wires or protects the outer periphery of the wire bundle.

9. An automotive wiring harness comprising the wire bundle according to claim 1 or claim 8.

10. The wire bundle of claim 8, wherein the aluminum hydroxide in the flame retardant has an average particle size in the range of 0.1 to 10 μm.

11. The wire bundle of claim 8, wherein the aluminum hydroxide in the flame retardant has an average particle size in the range of 0.5 to 3 μm.

12. The wire bundle of claim 8, wherein the flame retardant contains additional flame retardant other than the aluminum hydroxide.

13. The wire bundle of claim 12, wherein the additional flame retardant includes magnesium hydroxide.

14. The wire bundle of claim 8, wherein the covering material of the halogen-free electric wire has thermal durability to satisfy a thermal aging requirement in which no crack or no breaking on the surface is observed after 42 days of contact with a polyvinyl chloride resin at temperature of 150° C.

15. The wire bundle of claim 14, wherein the thermal durability is tested on a condition that:

the halogen-free electric wire and six cross-linked polyvinyl chloride electric wire are cut into pieces each having a length of 300 mm, wherein the halogen-free electric wire is prepared by melt-extruding pellets of a halogen-free composition onto an annealed copper stranded wire conductor so as to form an insulating coating of 0.7 mm in thickness, and then irradiating at 200 kGy onto the coating with electron beams having an accelerating voltage of 2 MeV, and the six cross-linked polyvinyl chloride electric wire are prepared by melt-extruding pellets of a polyvinyl chloride onto an annealed copper stranded wire conductor so as to form an insulating coating of 0.7 mm in thickness, and then irradiating at 100 kGy onto the coating with electron beams having an accelerating voltage of 2 MeV, the wire pieces are bundled in harness-shaped samples such that the halogen-free electric wire is disposed at the center, and the outer periphery of the wire bundle is wrapped with a cross-linked polyvinyl chloride adhesive tape so as to be pressed with it, the samples are aged in a Geer oven for 42 days at temperature of 150° C., the samples are disassembled to take out the halogen-free electric wires, the halogen-free electric wires are wound around a mandrel having the same diameter as that of the halogen-free electric wires, and the halogen-free electric wires are inspected as to the occurrence of cracks and breakings.

\* \* \* \* \*